(12) United States Patent
Fredette et al.

(10) Patent No.: US 8,253,273 B2
(45) Date of Patent: Aug. 28, 2012

(54) POWER SYSTEM HAVING AC AND DC POWER SOURCES

(75) Inventors: Steven J. Fredette, South Windsor, CT (US); Wesley E. Sedlacek, Jr., South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 467 days.

(21) Appl. No.: 12/452,658

(22) PCT Filed: Jul. 26, 2007

(86) PCT No.: PCT/US2007/016778
§ 371 (c)(1),
(2), (4) Date: Jan. 13, 2010

(87) PCT Pub. No.: WO2009/014522
PCT Pub. Date: Jan. 29, 2009

(65) Prior Publication Data
US 2010/0188869 A1    Jul. 29, 2010

(51) Int. Cl.
*H02J 9/00* (2006.01)
*H02J 3/38* (2006.01)

(52) U.S. Cl. .......................... 307/64; 307/51
(58) Field of Classification Search .......... 307/64, 307/51
See application file for complete search history.

(56) References Cited

U.S. PATENT DOCUMENTS

| | | | |
|---|---|---|---|
| 6,219,623 B1 | 4/2001 | Wills | |
| 6,304,006 B1 | 10/2001 | Jungreis | 307/64 |
| 6,465,910 B2 | 10/2002 | Young et al. | 307/64 |
| 6,757,590 B2 | 6/2004 | Ross et al. | 700/286 |
| 7,061,139 B2 | 6/2006 | Young et al. | 307/45 |
| 7,090,943 B2 | 8/2006 | Meredith et al. | 429/34 |
| 7,116,010 B2 | 10/2006 | Lasseter et al. | 307/45 |
| 2005/0135031 A1 | 6/2005 | Colby et al. | |
| 2006/0057441 A1* | 3/2006 | Wills | 429/13 |

FOREIGN PATENT DOCUMENTS

WO    WO 96/18937       6/1996
WO    WO 2005/036684    4/2005

* cited by examiner

*Primary Examiner* — Rexford Barnie
*Assistant Examiner* — Dru Parries
(74) *Attorney, Agent, or Firm* — Stephen A. Schneeberger (57) ABSTRACT

A power system (110; 210; 310) combines a power source (14) having a DC output (20A, 20B) with an AC supply from the AC grid (12) to provide AC to customer's loads (16) and DC to various DC auxiliary loads (134, 134A). The DC output of the DC power source (14) is connected in steady-state to the DC input (120A, 120B, 60) of a converter/bi-directional inverter (122; 222) for conversion therein to AC for connection (124, 124A, 32) to the customer's loads (16) and (124, 124B) to any AC auxiliary loads (134, 234). During start-up of the DC power source (14), an open isolation switch (70) disconnects that DC power source (14) from the bi-directional inverter (122; 222). A start-up power supply (50, 60; 250, 60; 90, 180, 60) selectively connects (56; 94) between the AC power grid (12) and the bi-directional inverter (122; 222) and/or DC controllers (134A) to provide a supply of rectified DC power at the inverter DC input and to certain DC auxiliary loads (134, 234). DC power is supplied to the auxiliary loads (134; 234) from the inverter DC input substantially continuously during start-up and steady state.

19 Claims, 4 Drawing Sheets

POWER SYSTEM HAVING AC AND DC POWER SOURCES

TECHNICAL FIELD

This disclosure relates to power systems and more particularly to the provision of electrical power from diverse sources. More particularly still, the disclosure relates to a system for providing electrical power from a power source having a DC output to load(s), to an AC electrical source, or both, and from the AC electrical source to load(s).

BACKGROUND ART

The supply and distribution of electrical power to various loads relies upon numerous different arrangements to accomplish that end. One area that is receiving increased attention is the provision of electrical power to various, typically stationary, loads not only from an AC power source such as the conventional AC electric utility grid (simply, "the AC grid") or a generator, but additionally from power sources such as fuel cells, microturbines, solar cells, and the like. Often the conventional AC electric grid serves as one source, but it is "partnered" with another source such as a fuel cell, etc. Indeed, some such systems rely on the fuel cell or microturbine or the like to provide the base load requirements for a dedicated group of customer loads, as for instance a hospital, mall, etc., and use the AC grid for peak requirements or as a back-up alternative.

Of course, such arrangements require the appropriate and sometimes complex and/or costly distribution and switching arrangements for dealing with such diverse power sources. This is further complicated by the fact many such power sources provide their power output as a direct current (DC), whereas the conventional grid provides, and many, most, or all of the customer loads are viewed as relying upon, alternating current (AC). This is traditionally the situation with a fuel cell power source, for example, which provides a DC output that is then converted, as by an inverter, to AC for connection to the customer's loads, often in parallel with the AC power grid. Examples of such power distribution arrangements may be found in U.S. Pat. Nos. 6,465,910; 6,757,590; and 7,061,139, for example, all assigned to the assignee of the present application.

Figure 1:
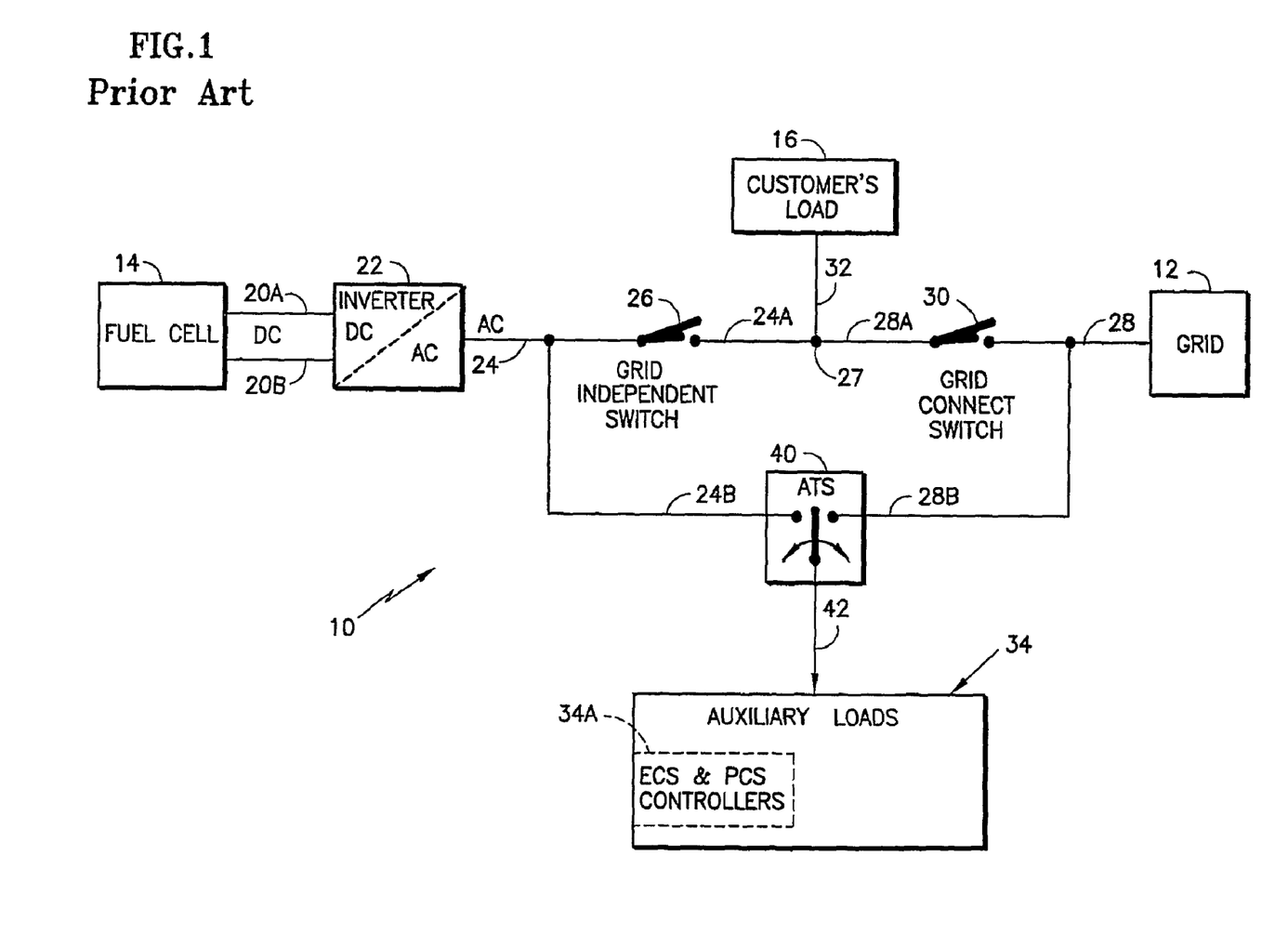
FIG. 1 is a simplified schematic block diagram of a power system having an AC source and a DC source in accordance with the prior art.

Typical in most such arrangements, as depicted in the block diagram of FIG. 1, is the provision of a power system 10 having an AC power source, such as the AC grid 12 as one power source, and one or more further power sources 14 typically providing, at least initially, DC power. In the example illustrated in FIG. 1 and for the purposes of further discussion of the disclosure, that source of DC power will appear and be described in the context of a fuel cell 14. However, it will be appreciated that power systems employing other types of power sources such as microturbines, photovoltaics, and the like may, to the extent they supply DC power that undergoes conversion to AC for connection to the customer load, similarly benefit from the disclosure.

Referring further to FIG. 1, the AC grid 12 and the fuel cell 14, either independently (in alternation) or in parallel combination, supply power to the so-called "customer's load" 16, typically in AC form. The fuel cell 14 serves as a source of DC power which is connected from its output, as via leads 20A and 20B, to the DC input of a converter 22, here depicted as inverter 22, for conversion from DC to AC. Although the AC power from the AC grid 12 and from the inverter 22 might typically be three-phase, for the simplicity of depiction in FIG. 1 and later with respect to the invention, it is shown as appearing on single electrical leads, with the other leads being assumed. Similarly, with respect to various of the control circuitry aspects of FIG. 1 and the disclosure, it will be understood that single-line representations have sometimes been used for twisted pairs, or grouped parallel leads, which serve as signal conductors.

The AC output from the inverter 22 appears on lead 24, which includes branches 24A and 24B. Branch 24A is depicted as including a grid-independent (G/I) switch 26 and extends to node 27. Similarly, the AC from the grid 12 appears on lead 28, which includes branches 28A and 28B. Branch 28A is depicted as including a grid-connect (G/C) switch 30 and extends to the node 27. A common lead 32 extends from node 27 to the customer loads 16 to supply them with AC power from either or both of the power sources 12 and 14, as determined by the states of the G/I and G/C switches 26 and 30 respectively. Typically, in steady state operation, at least the G/I switch 26 is normally closed to supply power from the fuel cell 14 and the G/C switch 30 may also be closed to simultaneously supply power in parallel from the AC grid 12. Any excess power supplied by the fuel cell 14 may be directed to the grid 12. If the G/C switch 30 is open, the fuel cell operates in the grid independent mode as the sole power supply to the customer's load(s) 16.

Importantly, there are associated with the operation of the fuel cell 14 power system a number of additional electrical loads, here generally designated as "auxiliary loads" 34. The auxiliary loads 34 may include fans, pumps, blowers, heaters, etc, as well as the controllers for the electronic control system (ECS) and the power conditioning system (PCS), here cumulatively shown as controller 34A, and may be AC and/or DC-type loads. Indeed, the auxiliary loads typically are, or have been, a mix of both AC and DC loads. An automatic transfer switch (ATS) 40, here illustrated as a single pole, double throw switch, has its common terminal connected via lead 42 to the auxiliary loads 34 to provide the power input thereto. The transfer switch 40 then serves to connect the auxiliary loads 34 either to the AC output of inverter 22 via branch lead 24B or to the AC output of the AC grid 12 via branch lead 28B. It will be noted that in either instance, the power supplied to the input of the function block designated "auxiliary loads 34" is AC, yet some of those loads are of the DC type and require further conversion of the AC power to DC power. This conversion/rectification may be provided internally of the function block 34 representing the auxiliary loads and, though not separately shown, will be understood to require the appropriate additional controls and/or circuitry.

The automatic transfer switch 40 includes control circuitry structured and connected to sense the presence of voltage on either branch lead 24B or branch lead 28B, with a bias toward branch lead 24B, and to close that circuit if voltage is present. During initial start-up of the fuel cell 14 power system, however, both the G/I switch 26 and the G/C switch 30 are in the "open" condition and there is no voltage on the branch lead 24B from the AC output of inverter 22. Thus, the ATS 40 closes the circuit through the branch lead 28B with the AC grid 12 to provide initial power to the auxiliary loads 34 until the fuel cell 14 power system is operating, whereupon the ATS 40 switches to the branch lead 24B to power the auxiliary loads. Additionally, appropriate controllers and operating algorithms, not shown, then regulate (close and/or open) the respective G/I switch 26 and G/C switch 30 to connect AC power to the customer loads 16 from one, the other, or both power sources 12 and 14.

While providing satisfactory operation, the afore-described arrangement includes several limitations. The ATS 40 is subject to occasional failure due to the mechanical switching between lines 24B and 28B. The same may be said of the G/I switch 26, though perhaps to a lesser extent. Also, the sequence of converting the DC from the fuel cell 14 to AC via the inverter 22 and then re-converting (rectifying) a portion of that back to DC to power those of the auxiliary loads 34 that require DC is an additional burden on system efficiency. This is particularly noteworthy when considered in the context that it is generally desirable to maximize the percentage of DC auxiliary loads relative to AC auxiliary loads for flexibility in adapting systems for use in differing countries because the voltages and frequencies for AC systems vary. Stated another way, the fewer the auxiliary loads that are AC powered, the fewer the number of such AC loads that need to be changed or customized for use in different countries, and thus a reduction in the costs that attend such needs for changes.

SUMMARY

A power system is provided in which a power source having a DC output, such as a fuel cell or the like, is connectable in parallel with a supply of AC power from an AC power source, as for example the AC electrical power grid. A power converter, typically a bi-directional inverter, is provided for converting DC at a DC input or terminal to AC at an AC output or terminal. An electrical connection exists between the AC output of the converter and one or more general, or customer, loads, to supply AC power thereto. A grid-connect switch is connected between the AC output of the converter and the supply of AC from the AC power grid for selectively connecting and disconnecting the AC power grid in parallel with the AC output of the converter. The auxiliary loads that operate the DC power source include one or more DC loads, some of which typically include electrical controls/controllers, variable speed drives, DC coils for actuators, power supplies and others for the DC power source and the power system. A start-up power supply is connectable between the supply of AC from the AC power grid and at least the converter during start-up of the DC power source, and is responsive to a supply of AC electrical power to provide a preliminary supply of DC power at least at the DC input of the converter. A form of precharge circuit provides that preliminary supply in at least two embodiments, and another embodiment additionally provides a small conventional DC supply to the provide part of that preliminary DC power to part of the auxiliary loads.

An isolation switch is connected between the output of the DC power source and the DC input of the converter for selectively isolating DC at the DC input of the converter from the DC power source during start-up of that DC power source. An electrical connection is provided between the DC input of the converter and the one or more DC auxiliary loads to provide DC power to those loads in an ongoing basis without further conversion.

In one embodiment, the start-up power supply comprises a precharge circuit having a rectifier for converting AC to a DC output, and that DC output is connected to a DC link capacitor across the DC input of the converter/inverter. The DC power appearing at the DC input to the converter/inverter and extended to the DC auxiliary loads is sufficient to energize ECS and/or PCS controllers, which in turn act to close the grid-connect switch and thus apply AC from the AC power grid to the AC output or terminal of the bi-directional inverter. This results in a commensurate DC voltage being provided at the inverter's DC input and of sufficient power to energize the remaining DC auxiliary loads required to operate the fuel cell(s) or other source of DC power.

In another embodiment, the start-up power supply comprises a precharge circuit that simply includes a current limiter without any rectification, and is instead connected to the AC output or terminal of the bi-directional inverter to cause the inverter, acting in reverse, to provide a DC voltage at a DC link capacitor across the inverter's DC input. As in the previous embodiment, that DC voltage is extended to the auxiliary loads and is of sufficient power to energize ECS and/or PCS controllers, which in turn act to close the grid-connect switch and thus apply full AC power from the AC power grid to the AC output of the bi-directional inverter to obtain the further results described above.

In either of those embodiments, the precharge circuit preferably includes a switch for selectively connecting and disconnecting it between the converter/inverter and the AC supply from the AC power grid. By disconnecting the precharge circuit when it has completed the initial closing of the grid-connect switch, the efficiencies of the power system are increased somewhat.

In a further embodiment, the start-up power supply is somewhat more complex, combining a small conventional AC to DC supply for the controllers of the auxiliary loads with precharge-like circuitry connected to the bi-directional inverter to collectively provide power to the auxiliary loads in stages during the start-up. The precharge-like circuitry may comprise an adequately sized LCL (inductor, capacitor, inductor) filter connectable between the AC source and the AC output of the bi-directional inverter. The small AC to DC supply may be temporarily connected between the AC source and the controllers of the auxiliary loads to initiate start-up, and may be disconnected once the controller closes a switch (grid connect) to supply AC to the LCL filter to thereafter complete the start-up phase.

A connection exists between the output of the DC power source, eg, the fuel cell, and a load associated with the DC auxiliary loads. That load is used to adjust the voltage at the output of the DC power source to thereby establish a reference voltage. Correspondingly, the DC auxiliary loads include a controller, typically a PCS controller, that is operative to adjust the DC voltage at the DC input of the converter/bi-directional inverter to substantially or nominally match the reference voltage at the DC power source output, and to then close the isolation switch(s) to connect the DC output of the DC power source with the DC input of the converter/inverter.

The arrangement described above obviates the need for the automatic transfer switch and also the grid-independent switch of those prior art power systems that combined AC and DC power sources to supply customer loads. Moreover, it enables the DC loads of the various auxiliary loads to be supplied with DC "directly" from the DC appearing at the converter DC input, particularly during steady state operation, without the requirement that AC from the converter AC output be again converted to DC for those DC auxiliary loads. Still further, this simplification of structure to provide DC power to the auxiliary loads fosters the use of an increased number of DC auxiliary loads relative to AC auxiliary loads, which in turn reduces the costs and complexities associated with adapting AC auxiliary loads to various different foreign AC power systems.

The foregoing features and advantages of the present disclosure will become more apparent in light of the following detailed description of exemplary embodiments thereof as illustrated in the accompanying drawings.

DETAILED DESCRIPTION

Figures 2, 3:
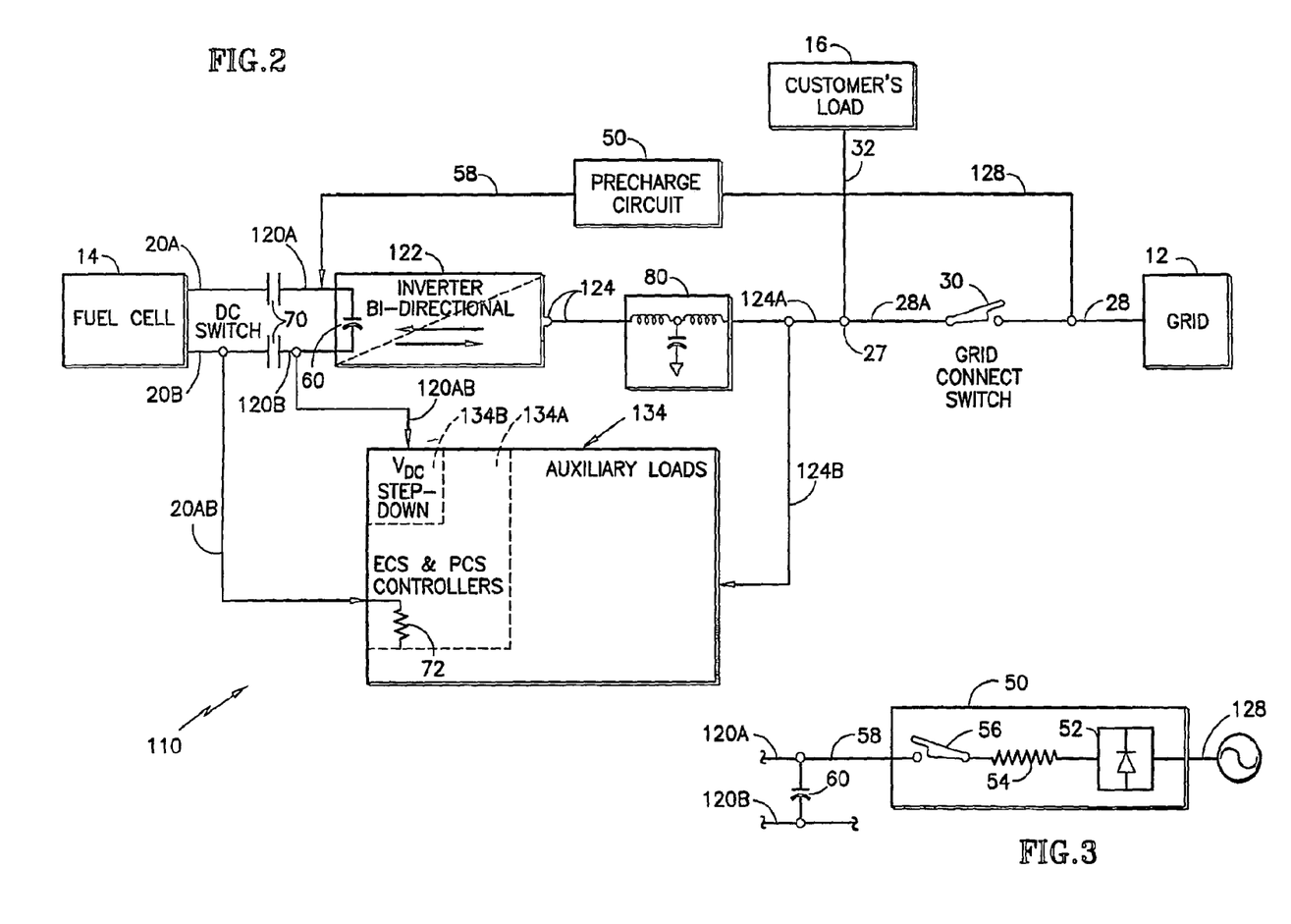
FIG. 2 is a simplified schematic block diagram of a power system similar to that of FIG. 1, but depicting an improved arrangement in accordance with one embodiment of the disclosure.
FIG. 3 is a simplified schematic diagram of a precharge circuit in accordance with the FIG. 2 embodiment.

Reference is made to FIG. 2 for an understanding of the improved power system 110 in accordance with one embodiment of the disclosure, particularly in the exemplary context of one or more fuel cells as the power source having the DC output and relative to the prior art of FIG. 1. Reference numbers identical to those of FIG. 1 are used in FIG. 2 for those components that are the same, or substantially the same, in the two configurations. However, where there is some functional, compositional, or structural difference occasioned by the disclosure, but the components of FIG. 2 nevertheless remain analogous to components in FIG. 1, they have been given the same reference number, but preceded by a "1". The following description will emphasize the novel character, structure, and/or function of the power system of the disclosure, and will attempt to minimize repetition of description that is duplicative of that provided with respect to FIG. 1.

In the power system 110 of FIG. 2, the power source having the DC output is again depicted as a fuel cell 14, but of course could be a microturbine, photovoltaic, or the like. Similarly, the AC supply 12 is provided by an AC power source such as the AC power grid, a dedicated generator, or equivalent, and the customer loads 16 are typically AC, but are not limited thereto. The auxiliary loads have been designated 134 and are similar to the loads 34 of FIG. 1 which support operation of the fuel cell 14, etc, but may now beneficially include a greater relative content of DC-powered loads than previously, including the possibility of all loads being DC-powered, and the included controller(s) 134A for the ECS and PCS may differ somewhat in the control that is effected by the present disclosure. Also as previously, the AC supply from the AC power grid may be selectively connected to the customer load 16 via lead 28, grid-connect switch 30, node 27, and lead 32. Much of the remaining circuitry differs, however, as will be explained.

Importantly, the converter/inverter 122 is inherently a bi-directional inverter having a pair of DC input leads/terminals 120A and 120B spanned by a DC link capacitor 60 across which the DC potential is developed and/or applied, and an AC output/terminal designated 124. The DC link capacitor 60 is depicted as a single capacitor in the converter/inverter 122 and spanning the input terminals 120A, 120B, but it will be understood that it is merely representative and might be multiple capacitors or the like arrayed to provide the necessary capacity, and either internal or external to the converter/inverter 122. The bi-directionality of the converter/inverter 122 allows not only the conversion of a DC voltage at the DC input 120A, 120B to an AC potential at the AC output 124, but also allows an AC voltage applied at the AC output/terminal 124 to be rectified and appear at the DC input 120A, 120B as a DC voltage. Additionally, the converter/inverter 122 has the ability to control the DC to any controlled level. If the AC voltage, (peak, not rms) applied to the AC output/terminal 124 is greater than the DC on the input, then the converter/inverter 122 will automatically rectify the AC to DC. However, to actively control DC levels, the PCS controller 134A will need to be active and take control. Also, the converter/inverter itself may take various forms, with the use of pulse width modulation (PWM) being a preferred technique for the conversion of the voltages. For the sake of generalization and simplicity, no specific conversion circuitry has been depicted within the bi-directional inverter 122.

In keeping with the disclosure, isolation switch, or switches, 70 are located in the leads between the DC outputs 20A, 20B from fuel cell 14 and the DC leads/inputs 120A, 120B to the bi-directional inverter 122. This switch may be in the form of an electrical or mechanical switch or diode for preventing power flow into the DC power source. The isolation switch 70 is open during fuel cell start-up because the fuel cell can not be exposed to voltage on its output DC terminals prior to start-up because reverse power flow to the fuel cell causes life decay, and is closed during normal operation.

Importantly, the disclosure employs the use of a simple, low-cost start-up power supply, here precharge circuit 50 in combination with the DC link capacitor 60, to establish an initial DC voltage on, or at, the DC inputs 120A, 120B to the bi-directional inverter 122. More specifically, an AC voltage from the AC power grid 12 is connected via lead 28 and branch lead 128 to the input of precharge circuit 50, and the output of that precharge circuit is connected via lead 58 to the capacitor 60 at the DC input 120A, 120B to the bi-directional inverter 122.

Referring to FIG. 3 for additional detail, the precharge circuit 50 includes internal rectification circuitry 52, here graphically represented by a single diode. In fact, the rectifier of the precharge circuit 50 may be any of several simple, low-cost arrangements for rectifying the AC grid voltage to a DC voltage of modest power level. A current limiting resistance or impedance 54 is serially connected in the precharge circuit 50 to limit the current flowing to the DC voltage developed across the capacitor 60 at the DC input to the bi-directional inverter 122. A switch 56 is connected in the series circuit with the rectifiers 52 and current limiting resistance 54, and is closed during start-up of the fuel cell 14 to connect the rectified DC to the DC input 120A, 120B of the bi-directional inverter 122. However, that switch 56 may be opened after start-up to effectively remove the precharge circuit 50 during normal operation and thereby slightly improve the efficiency of the power system 110.

A connection, here designated 120AB, extends from the DC input 120A, 120B of the bi-directional inverter 122 to a corresponding DC input at the auxiliary loads 134 to connect the DC voltage appearing at the former DC input to the latter DC input. More specifically, that connection of DC voltage to the auxiliary loads 134 is connected to directly provide power, without further AC/DC conversion, to the various DC auxiliary loads, including importantly, the controller(s) 134A for the ECS and PCS, as well as to other loads including for example, variable speed drives, coil voltages for valves, power supplies for control or power distribution, etc. Either in lead 120AB or, as depicted here, at/in the DC input to the auxiliary loads 134, there is typically provided circuitry 134B for the controlled step-down, if appropriate, of a higher DC voltage (e.g., 700 $V_{DC}$) on capacitor 60 to the typical 24$V_{DC}$ required by at least some of the auxiliary loads, including the controller 134A. It will be understood that the ECS and PCS controllers 134A include appropriate sequencing algorithms to accomplish the start-up and steady-state operations as described.

A separate DC connection, here designated 20AB, extends from the DC outputs 20A, 20B of the fuel cell 14 to an appropriate load, or loads, 72 in the auxiliary loads 134, and here depicted for simplicity as a resistor, for establishing a reference voltage at the DC output of the fuel cell 14 during start-up and preparatory to closure of the isolation switch(es) 70. The load resistor 72 is typically fixed, though may also be variable. This function will be described in greater detail hereinafter.

At the AC output of the bi-directional inverter 122 there is connected a lead 124 that extends to the AC node 27. The reference number 124 is also used to designate that AC output of the inverter 122. The lead 124 includes a branch 124B that extends to the AC input of the auxiliary loads 134 to supply the AC power thereto. Included in lead 124 may typically be an LCL filter 80 of conventional design for not only suppressing harmonics and being required for AC power flow, but also for developing the peak voltages needed at the DC input of the bi-directional inverter 122 for matching with the output of fuel cell 14 preparatory to closure of the isolation switch(es) 70, as will be explained later in more detail. Assuming the presence of the LCL filter 80, the portion of lead 124 between that filter and the node 27 is designated branch 124A.

Attention is turned now to operation of the power system 110 in accordance with the disclosure. Assuming that the DC power source, fuel cell 14, is initially in a shut-down state and that the grid connect switch 30 is open, it is necessary to start the fuel cell and then connect it to the customer loads 16 and auxiliary loads 134 as sources of AC and DC power respectively, as well as connect the AC power of grid 12 to both of those loads as well. Assuming the switch 56 in the precharge circuit is initially open, that switch is closed either manually or remotely using a separate dedicated control and power supply. Alternatively, the switch 56 could be a normally-closed switch, and is opened after the precharge is completed. The precharge circuit 50 then becomes operational and converts AC power from the AC power grid 12 to a rectified DC which is developed across the capacitor 60 at the DC input to the bi-directional inverter 122. The DC voltage developed at this time and in this manner is of limited power, but is sufficient when connected via lead 120AB, to power the controllers 134A through at least the initial start-up functions. Although the precharge circuit could be sized to handle the power supply, that would require expensive scaling up, and is not necessary for the preferred embodiments. The controllers 134A act first to automatically close the grid-connect switch 30. This in turn serves to connect the AC supply from grid 12 not only to the customer's loads 16 and the AC input of the auxiliary loads 134, but to also connect that AC energy through the LCL filter 80 and lead 124 to the AC output of the bi-directional inverter 122. However, because of the bi-directionality of that inverter, by default the AC applied at that output is internally rectified and appears at the DC input 120A, 120B and across capacitor 60 as a source of significant DC energy. That DC energy is then sufficient, when extended via lead 120AB, to fully serve the DC needs of the auxiliary loads 134. In this way the fans, pumps, etc. required to complete start-up of the fuel cell 14 become operational. Also, once the grid-connect switch 30 is closed to supply AC power to the bi-directional inverter 122, the precharge circuit 50 is no longer required to supply limited DC power, and its switch 56 may be opened to remove it from the circuit.

At this time the fuel cell 14 is becoming operational and providing a DC potential at its DC output 20A, 20B, but the open isolation switch(es) 70 prevent that potential from yet being connected to the bi-directional inverter 122. The load(s) 72 in the auxiliary loads 134 serve as "dummy" loads and serve to establish a reference output potential of, for example, 1200 VDC. Correspondingly, the controllers 134A act to cause the bi-directional inverter 122 to become active and, by switching the power semiconductors of the inverter in a known manner, to regulate the DC potential developed by the bi-directional inverter 122 acting in reverse and appearing at its DC input 120A, 120B. Once the DC voltages at the respective outputs 20A, 20B and inputs 120A, 120B are substantially matched to avoid inrush currents, with the outputs 20A, 20B preferably being a few volts greater than at inputs 120A, 120B, the isolation switch(es) 70 are then closed and the fuel cell 14 begins supplying DC power to the auxiliary loads 134 via lead 120AB and DC power to the DC inputs 120A, 120B of the bi-directional inverter 122. That inverter then is controlled by an algorithm in the controller to operate in the forward direction to convert the DC to AC for output to lead 124 and extension to the AC auxiliary loads 134 and the customer loads 16.

As noted previously, there is now available a supply of DC power directly from the fuel cell 14 and delivered directly to the DC loads of the auxiliary loads 134 without requiring further conversions. This improves the efficiency of the power system 110, and additionally supports a relative increase in the use of DC auxiliary loads that avoid the frequency and/or voltage concerns of AC loads operated in countries having differing AC power systems.

Figures 4, 5:
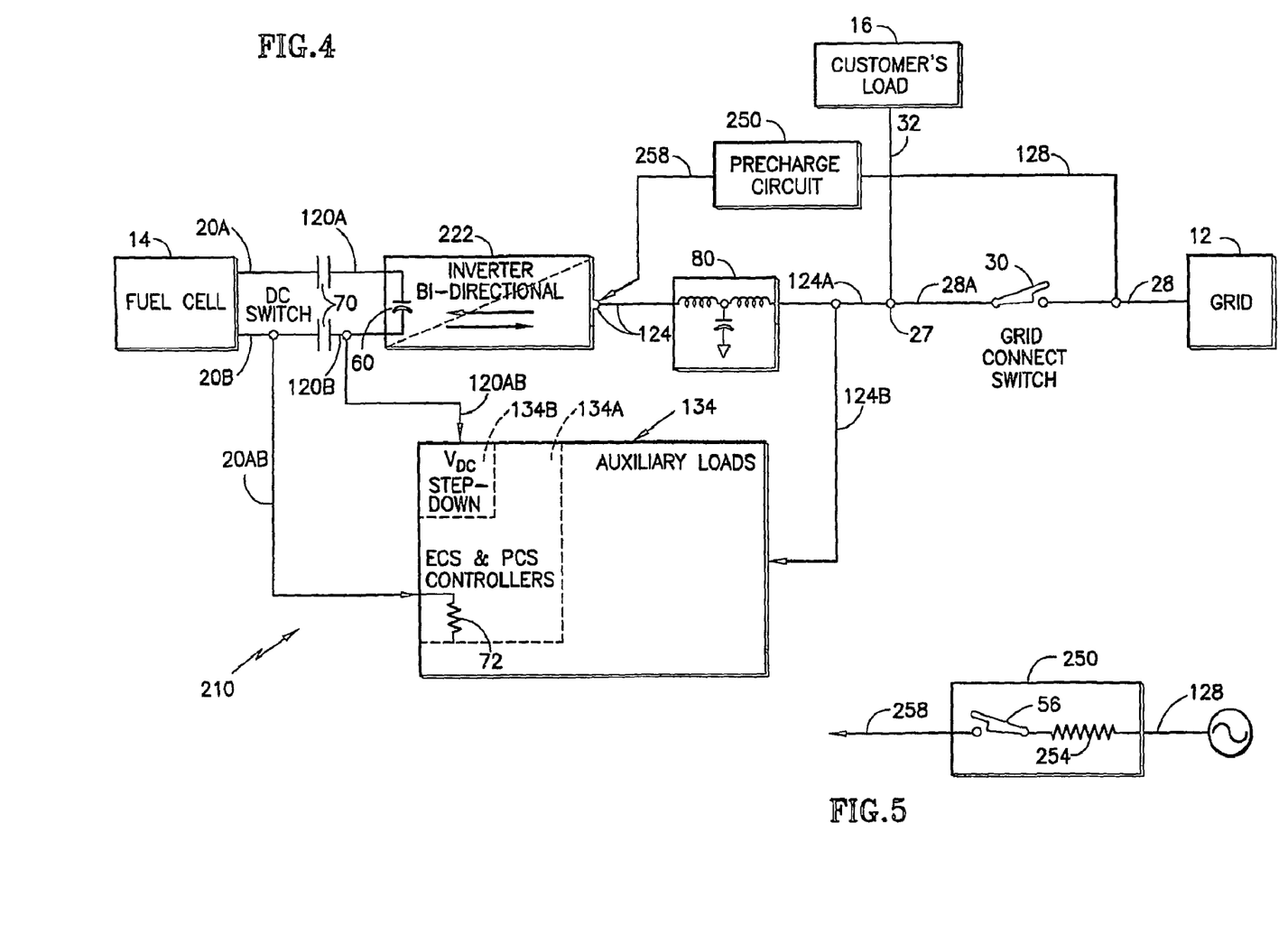
FIG. 4 is a simplified schematic block diagram of a power system similar to that of FIG. 2, but depicting an alternate arrangement of the start-up power supply in accordance with another embodiment of the disclosure.
FIG. 5 is a simplified schematic diagram of a precharge circuit in accordance with the FIG. 4 embodiment.

An even further simplification of the power system is possible as depicted in the embodiment of FIG. 4. Referring to the power system 210 of FIG. 4, reference numbers identical to those of FIGS. 1 and/or 2 are used in FIG. 4 for those components that are the same, or substantially the same, in the respective one, the other, or both of the FIGS. 1 and 2 configurations. However, where there is some functional, compositional, or structural difference occasioned by this embodiment of the disclosure, but the components of FIG. 4 nevertheless remain analogous to components in FIG. 2, they have been given the same reference number, but preceded by a "2". The following description will emphasize the novel character, structure, and/or function of the power system of the disclosure, and will attempt to minimize repetition of description that is duplicative of that provided with respect to FIGS. 1 and/or 2.

In the power system 210 of FIG. 4, the power source having the DC output is again depicted as a fuel cell 14. Similarly, the AC supply 12 is provided by the AC power grid and the customer loads 16 are typically AC, but are not limited thereto. The auxiliary loads have been designated 134 and may beneficially include a relatively greater content of DC-powered loads than the Prior Art, and the included controller(s) 134A for the ECS and PCS may differ somewhat in the manner of the control that is effected by the present disclosure. Also as previously, the AC supply from the AC power grid may be selectively connected to the customer load 16 via lead 28, grid-connect switch 30, node 27, and lead 32. As discussed with respect to FIG. 2, the isolation switches 70, the DC link capacitor 60, the DC leads 20AB and 120AB to the auxiliary loads 134, the load 72 in the auxiliary loads 134, and the LCL filter 80 in AC lead 124 connected to the AC terminal of the bi-directional inverter 222 are substantially the same. Indeed, even the bi-directional inverter 222 may be physically similar or identical to the inverter 122 of FIG. 2, however it has been given the prefix "2" in the FIG. 4 embodiment to highlight a functional distinction in its use.

In the main, it is the precharge circuit 250 of the start-up power supply and the manner in which it is connected to the bi-directional inverter 222 that constitutes the major difference between the FIG. 4 embodiment and that of FIG. 2. The precharge circuit 250, seen in greater detail in FIG. 5, may be simplified to include substantially only a current-limiting resistor or impedance 254 and a serially-connected switch 56. An AC input is received as previously on branch lead 128 from the AC power grid 12, and the output of the precharge circuit 250 is connected via a lead 258 to the normal AC output 124 of the bi-directional inverter 222. In the present instance, that normal AC output 124 of the bi-directional inverter 222 also serves as an input for the current-limited AC signal from the precharge circuit 250. Because the bi-directional inverter 222 is then caused to operate in the reverse direction, its internal rectification circuitry serves to rectify/convert the AC voltage from the precharge circuit 250 to a DC potential developed across the capacitor 60 at the DC input of that inverter.

At this point, although the DC energy at that DC input 120A, 120B of the bi-directional inverter is limited as it was also for the FIG. 2 embodiment, it nonetheless is similarly sufficient to energize the controllers 134A of the auxiliary loads 134 and close grid-connect switch 30 as previously. Thereafter, the operation of the power system 210 is essentially the same as it was for system 110 of FIG. 2. A major AC supply is applied via lead 124 to the AC output of the bi-directional inverter 222 which, acting in reverse, rectifies that AC supply to provide a major DC signal which then powers the DC loads of the auxiliary loads 134. This starts the fuel cell 14, the DC voltages in the 2 separate circuits are balanced, and the isolation switches 70 are closed to establish normal forward operation. This embodiment has the added benefit of not requiring a separate rectification circuit in the precharge circuit, but instead using that rectification capability of the bi-directional inverter 222 when operated in reverse.

Figure 6:
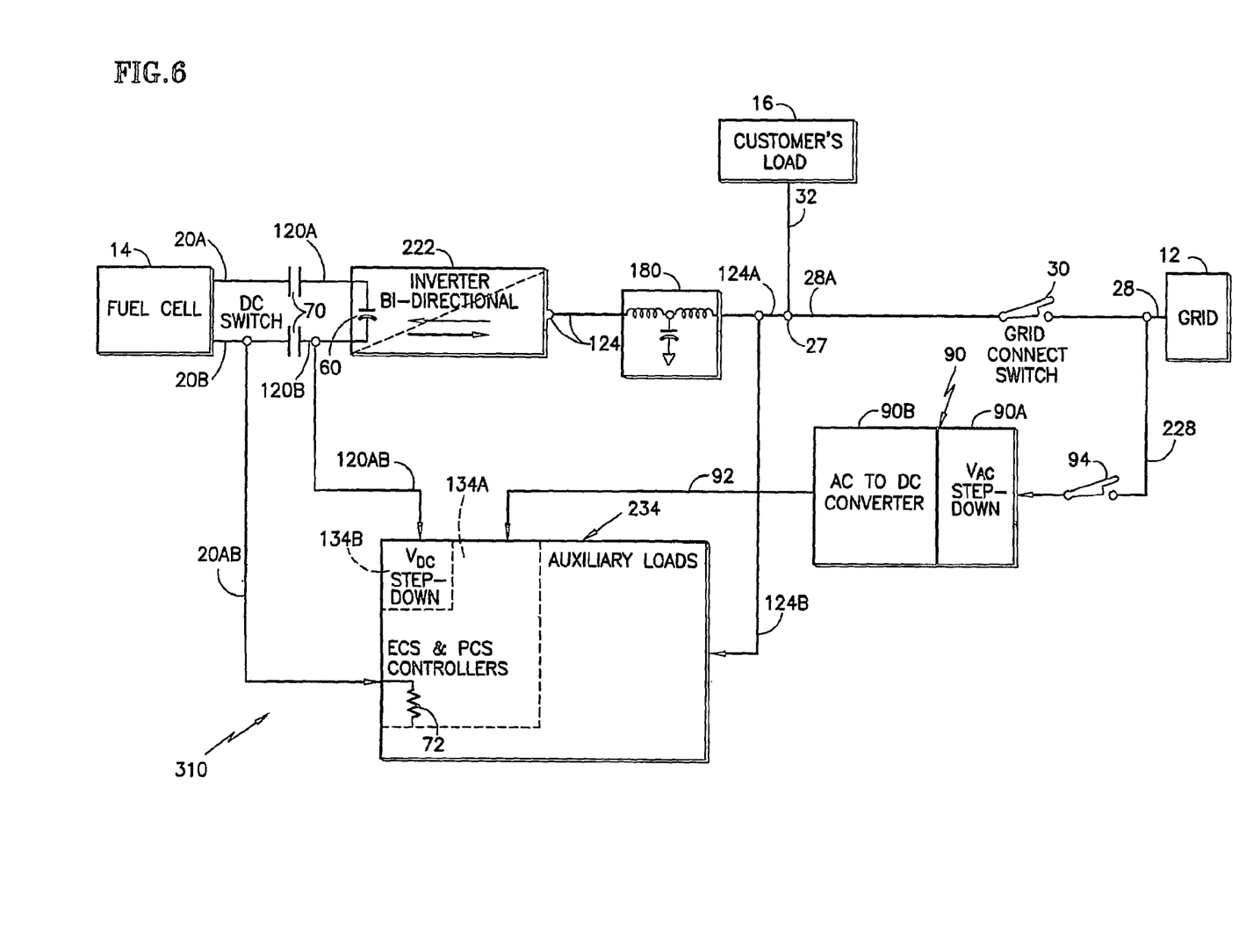
FIG. 6 is a simplified schematic block diagram of a power system similar to those of FIGS. 2 and 4, but depicting yet a further arrangement of the start-up power supply in accordance with another embodiment of the disclosure.

Reference is now made to FIG. 6 which depicts another embodiment of the power system 310 of the disclosure in which the start-up power supply is somewhat more complex, combining a small conventional AC to DC power supply 90 for the controllers 134A of the auxiliary loads 234 with precharge-like circuitry 180 connected to the bi-directional inverter 222 to collectively provide power to the auxiliary loads 234 in stages during the start-up. More specifically and in greater detail, Referring to the power system 310 of FIG. 6, reference numbers identical to those of FIGS. 1-5 are used in FIG. 6 for those components that are the same, or substantially the same, in the respective one or more of the FIGS. 1-5 configurations. However, where there is some functional, compositional, or structural difference occasioned by this embodiment of the disclosure, but the components of FIG. 6 nevertheless remain analogous to components in FIG. 2-5, they have been given the same reference number, but preceded by a "1, 2, or 3" as appropriate. The following description will emphasize the novel character, structure, and/or function of the power system of the disclosure, and will attempt to minimize repetition of description that is duplicative of that provided with respect to FIGS. 1-5.

In the power system 310 of FIG. 6, the power source having the DC output is again depicted as a fuel cell 14. Similarly, the AC supply 12 is provided by the AC power grid and the customer's loads 16 are typically AC, but are not limited thereto. The auxiliary loads have been designated 234 and may beneficially include a relatively greater content of DC-powered loads than the Prior Art, and the included controller (s) 134A for the ECS and PCS may differ somewhat in the manner of the control that is effected by the present disclosure. Also as previously, the AC supply from the AC power grid may be selectively connected to the customer load 16 via lead 28, grid-connect switch 30, node 27, and lead 32. As discussed with respect to FIGS. 2 and 4, the isolation switches 70, the DC link capacitor 60, the DC leads 20AB and 120AB to the auxiliary loads 234, and the load 72 in the auxiliary loads 234 are substantially the same. The bi-directional inverter 222 may be physically similar or identical to, and function similarly to, the inverter 222 of FIG. 4. The LCL filter 180 of FIG. 6 is functionally similar to that of FIGS. 2 and 4, but has been given the prefix "1" because its component values may differ to satisfy an additional requirement of this FIG. 6 embodiment, as will be explained.

In the main, it is the form of the start-up power supply of FIG. 6 that differs from that/those of the FIGS. 2 and 4 embodiments. More specifically, the precharge circuits 50 and 250 of the FIGS. 2 and 4 embodiments are replaced by a small conventional AC to DC supply 90 for the controllers 134A of the auxiliary loads 234 and precharge-like circuitry, such as an enhanced LCL filter 180 connected to the bi-directional inverter 222, to collectively provide power to the auxiliary loads 234 in stages during the start-up.

The small AC to DC supply 90 may take any of several forms, with simplicity and low cost being important objectives. In the illustrated example, the AC to DC supply 90 comprises an AC voltage step-down device 90A, such as a transformer, to step down the, for example, 480 $V_{AC}$ grid voltage appearing on lead 228 to a nominal 24 $V_{DC}$, followed by an AC to DC converter 90B to provide the requisite initial DC start-up voltage to the controllers 134A of the auxiliary loads 234 via lead 92. It will be understood and appreciated that component devices 90A and 90B may be combined into a singular unit. That AC to DC power supply 90 may be temporarily connected by a switch 94, shown as normally open, however, could be normally-closed, between the AC source and the controllers 134A to initiate start-up, and may be disconnected once the controller 134A closes a switch 30 (grid connect) to supply AC to the LCL filter 180 to thereafter complete the start-up phase.

The LCL filter 80 in this FIG. 6 embodiment is structurally and functionally similar to that of the earlier embodiments, but the inductors are appropriately sized to limit the inrush current to the bi-directional inverter 222 and the DC link capacitor 60 when the grid connect switch 30 is closed by initial start-up control action. The sizing of the inductors in the LCL filter 180 is coordinated with the capacitor peak current rating of the DC link capacitor 60 in a manner well known.

Referring briefly to the operation of the power system 310 of FIG. 6, only the start-up function differs somewhat, with steady-state operation being the same. To initiate start-up of the fuel cell 14 in the power system 310, the start-up power supply is made operative by activating the AC to DC power supply 90, as for example, by closing a switch 94 in either lead 92 or lead 228 as depicted here. The high AC grid voltage is reduced at $V_{AC}$ step-down 90A, is then converted to DC at converter 90B, and is extended via lead 92 to at least such portion of controllers 134A as is required to initiate start-up by closing the grid-connect switch 30. This source of power to the controllers 134A may be of limited capacity and limited duration, thus facilitating its simplicity and low cost. Soon after the grid-connect switch 30 is closed, the power supply 90 may be disconnected.

Once the grid-connect switch 30 is closed, an AC current from the grid 12 will attempt to surge through the LCL filter 180 and the AC-to-DC conversion of the bi-directional inverter 222 to establish a charge on the DC link capacitor 60. The inductances of the filter 180 are selected to limit that inrush current to an appropriate level within the capacity of the DC link capacitor(s) 60. Thereafter the system functions similarly to the the previous embodiments, and particularly the FIG. 4 embodiment, with the source of DC power from the DC link capacitor 60 at the DC input 120A, 120B of the inverter 222 being sufficient to energize the controllers 134A and the general DC loads of the auxiliary loads 234 to complete the remainder of the start-up sequence to start the fuel cell 14 and effect the voltage matching and subsequent closure of isolation switches 70 to bring the fuel cell on-line as the source of DC power. Of course, any of the auxiliary loads 234 requiring AC power will obtain it via lead 124B as soon as the grid-connect switch 30 is/was closed.

As noted earlier, the disclosure not only replaces the more expensive ATS and grid-independent switches with the less expensive start-up power supply and isolation switch(es), but it also provides DC power directly to various DC auxiliary loads from the interface between the source of DC power and the bi-directional inverter, both during start-up and steady-state operation, without requiring further conversion from AC to DC. This in turn supports the relative increased use of DC auxiliary loads, which is beneficial from the standpoint of reducing the need for various alternative AC loads to satisfy the differing voltage/frequency needs of different countries.

Although the disclosure has been described and illustrated with respect to the exemplary embodiments thereof, it should be understood by those skilled in the art that the foregoing and various other changes, omissions and additions may be made without departing from the spirit and scope of the disclosure.

What is claimed is:

1. A power system (110; 210; 310) comprising:
   a power source (14) having a DC output (20A, 20B);
   a power converter (122; 222) for converting DC at a DC input/terminal (120A, 120B) thereof to AC at an AC output/terminal (124) thereof;
   a supply of AC from an AC power source (12);
   an electrical connection (124, 124A, 32) between the AC output/terminal of the converter (122; 222) and at least one general load (16) to supply AC power to those loads;
   an AC power source-connect switch (30) connected (124, 124A, 28A, 28) between the AC output/terminal (124) of the converter and the supply of AC from the AC power source configured to selectively connect and disconnect the AC power source (12) in parallel with the AC output/terminal (124) of the converter (122; 222);
   at least one DC auxiliary load (134, 134A, 134B; 234) to operate the power source (14) having the DC output;
   a start-up power supply (50, 60; 250, 60; 90, 180, 60), connectable (28, 128, 58, 30, 124A, 124; 28, 128, 258, 30 124A, 124; 28, 228, 92, 30, 124a, 124) between the supply of AC from the AC power source (12) and at least the converter (122; 222) during at least start-up of the power source (14) having the DC output, and being responsive to a supply (28, 128, 228, 30, 124A, 124) of AC power (12) to provide a start-up supply of DC power (60; 60, 90) at least at the DC input (120A, 120B) of the converter (122; 222);
   an isolation switch (70) operatively connected between the output (20A, 20B) of the power source (14) having the DC output and the DC input/terminal (120A, 120B) of the converter (122; 222) and configured to selectively isolate DC at the DC input of the converter from the DC power source during start-up of the source (14) having the DC output; and
   an electrical connection (120AB) to supply DC power at the DC input/terminal (120A, 120B, 60) of the converter (122, 222) to the at least one DC auxiliary load (134, 134A, 134B, 234) without further conversion.

2. The power system (110; 210; 310) of claim 1 wherein the said power source having a DC output comprises at least one fuel cell (14).

3. The power system (110; 210; 310) of claim 1 wherein said power converter (122; 222) comprises a bi-directional inverter (122; 222).

4. The power system (110; 210; 310) of claim 1 wherein the at least one DC auxiliary load (134, 134A, 134B; 234) comprises at least a DC-powered controller (134A) having an Electronic Control System and a Power Control System.

5. The power system (110; 210; 310) of claim 1 wherein said start-up power supply (50, 60; 250, 60) comprises a precharge circuit (50; 250) having a switch (56) for selectively connecting and disconnecting said AC supply from the AC power source (12) through said precharge circuit to said converter (122; 222), whereby the connection from said AC power source to said converter through the precharge circuit may be disconnected after start-up of the power source (14) having the DC output.

6. The power system (110) of claim 1 wherein said start-up power supply (50, 60) comprises a precharge circuit (50) having a rectifier (52) for converting AC to a DC output, and wherein the DC output of said precharge circuit is connected (58) to a DC link capacitor (60) across the DC input/terminal (120A, 120B) of said converter (122).

7. The power system (210) of claim 3 wherein said start-up power supply comprises a precharge circuit (250) having a current-limited, switchable connection (254, 56) between the supply of AC from the AC power source (12) and the AC output/terminal (124) of the bi-directional inverter (222), whereby current-limited AC from the AC supply is rectified by the bi-directional inverter (222) and appears as DC at a DC link capacitor (60) across the DC input/terminal (120A, 120B) of the inverter (222).

8. The power system (310) of claim 3 wherein the at least one DC auxiliary load (134, 134A, 134b; 234) comprises at least a DC-powered controller (134A) having one or both of an Electronic Control System and a Power Control System, and wherein said start-up power supply comprises an AC to DC power supply operatively connectable between the AC power source (10) and the DC-powered controller (134A) to supply a limited DC voltage thereto, an inductance (180) connected in series between the AC power source-connect switch (30) and the AC output/terminal (124) of the bi-directional inverter (222), and a DC link capacitor (60) across the DC input/terminal (120A, 120B) of said converter (122), whereby connection (92) of said limited DC voltage to said DC-powered controller (134A) is operative to close said AC power source-connect switch (30) and supply current-limited AC power from the AC power source (10) through the inductance (180) to the AC output/terminal (124) of the inverter (222) for conversion to a DC voltage appearing on the DC link capacitor (60).

9. The power system (110; 210; 310) of claim 1 further including a connection (20AB) between the power source (14) having the DC output and the at least one DC auxiliary load (134, 134A; 234), and wherein the at least one DC auxiliary load includes a load impedance (72) for controllably adjusting the voltage at the DC output (20A, 20B) of the DC power source (14) to provide a reference voltage.

10. The power system (110; 210; 310) of claim 9 wherein the at least one DC auxiliary load (134, 134A; 234) further includes at least a DC-powered controller (134A), which is operative to adjust the DC voltage across a DC link capacitor at the DC input/terminal (120A, 120B) of the converter (122; 222) to substantially match said reference voltage at the DC output (20A, 20B) of the DC power source (14), and is also operative to close the isolation switch (70) to connect the DC output (20A, 20B) of the DC power source (14) with the DC input/terminal (120A, 120B) of the converter (122, 222).

11. The power system (110; 210) of claim 4 wherein said power converter (122; 222) comprises a bi-directional inverter (122; 222), said AC power source-connect switch (30) is normally open, and wherein, following connection (120AB) of DC power to said DC-powered controller (134A), at least one of said Electronic Control System and said Power Control System acting to close the AC power source-connect switch to provide AC power (12, 28, 124A, 124) to the AC output/terminal (124) of the bi-directional inverter (122; 222), whereby the AC power from said AC power source (12) is rectified by the bi-directional inverter and appears as DC voltage across a DC link capacitor (60) at the DC input/terminal (120A, 120B) of said inverter.

12. The power system (110; 210; 310) of claim 1 wherein the AC power source (12) comprises the AC electrical grid.

13. The power system (110) of claim 6 wherein the AC power source (12) comprises the AC electrical grid; said power source having a DC output comprises at least one fuel cell (14); said power converter (122) comprises a bi-directional inverter (122); said at least one DC auxiliary load (134, 134A, 134B) comprises at least a DC-powered controller (134A) having one or both of an Electronic Control System and a Power Control System; said start-up power supply (50, 60) comprises a precharge circuit (50) having a switch (56) for selectively connecting and disconnecting said AC supply from the AC power source (12) through said precharge circuit to said converter (122), whereby the connection from said AC power source to said converter through the precharge circuit may be disconnected after start-up of the power source (14) having the DC output; a connection (20AB) between the power source (14) having the DC output and the at least one DC auxiliary load (134, 134A), and wherein the at least one DC auxiliary load includes a load impedance (72) for controllably adjusting the voltage at the DC output (20A, 20B) of the DC power source (14) to provide a reference voltage; said DC-powered controller (134A) being operative to adjust the DC voltage across a DC link capacitor (60) at the DC input/terminal (120A, 120B) of the converter (122) to substantially match said reference voltage at the DC output (20A, 20B) of the DC power source (14), and is also operative to close the isolation switch (70) to connect the DC output (20A, 20B) of the DC power source (14) with the DC input/terminal (120A, 120B) of the converter (122); said AC power source-connect switch (30) is normally open, and wherein, following connection (120AB) of DC power to said DC-powered controller (134A), at least one of said Electronic Control System and said Power Control System acts to close the AC power source-connect switch to provide AC power (12, 28, 124A, 124) to the AC output/terminal (124) of the bi-directional inverter (122), whereby the AC power from said AC power source (12) is rectified by the bi-directional inverter and appears as DC voltage across a DC link capacitor (60) at the DC input/terminal (120A, 120B) of said inverter.

14. The power system (210) of claim 7 wherein the AC power source (12) comprises the AC electrical grid; said power source having a DC output comprises at least one fuel cell (14); said at least one DC auxiliary load (134, 134A, 134B) comprises at least a DC-powered controller (134A) having one or both of an Electronic Control System and a Power Control System; said start-up power supply (250, 60) comprises a precharge circuit (250) having a switch (56) for selectively connecting and disconnecting said AC supply from the AC power source (12) through said precharge circuit to said converter (222), whereby the connection from said AC power source to said converter through the precharge circuit may be disconnected after start-up of the power source (14) having the DC output; a connection (20AB) between the power source (14) having the DC output and the at least one DC auxiliary load (134, 134A), and wherein the at least one DC auxiliary load includes a load impedance (72) for controllably adjusting the voltage at the DC output (20A, 20B) of the DC power source (14) to provide a reference voltage; said DC-powered controller (134A) being operative to adjust the DC voltage across a DC link capacitor (60) at the DC input/terminal (120A, 120B) of the converter (222) to substantially match said reference voltage at the DC output (20A, 20B) of the DC power source (14), and is also operative to close the isolation switch (70) to connect the DC output (20A, 20B) of the DC power source (14) with the DC input/terminal (120A, 120B) of the converter (222); said AC power source-connect switch (30) is normally open, and wherein, following connection (120AB) of DC power to said DC-powered controller (134A), at least one of said Electronic Control System and said Power Control System acts to close the AC power source-connect switch to provide AC power (12, 28, 124A, 124) to the AC output/terminal (124) of the bi-directional inverter (122), whereby the AC power from said AC power source (12) is rectified by the bi-directional inverter and appears as DC voltage across a DC link capacitor (60) at the DC input/terminal (120A, 120B) of said inverter.

15. The power system (310) of claim 8 wherein the AC power source (12) comprises the AC electrical grid; said power source having a DC output comprises at least one fuel cell (14); and further including a connection (20AB) between the power source (14) having the DC output and the at least one DC auxiliary load (134, 134A; 234), and wherein the at least one DC auxiliary load includes a load impedance (72) for controllably adjusting the voltage at the DC output (20A, 20B) of the DC power source (14) to provide a reference voltage; said DC-powered controller (134A) being operative to adjust the DC voltage across a DC link capacitor (60) at the DC input/terminal (120A, 120B) of the converter (222) to substantially match said reference voltage at the DC output (20A, 20B) of the DC power source (14), and being also operative to close the isolation switch (70) to connect the DC output (20A, 20B) of the DC power source (14) with the DC input/terminal (120A, 120B) of the converter (222).

16. The power system (110, 210, 310) of claim 3 further including an inductance (80, 180) that is connectable in series between the supply of AC from the AC power source (12) and the AC output/terminal (124) of the bidirectional inverter.

17. The power system (110, 210, 310) of claim 16 wherein said inductance (80, 180) comprises the inductance in an LCL filter (80, 180).

18. The power system (110, 210, 310) of claim 1 including a DC link capacitor (60) operatively connected across the DC input/terminal (120A, 120B) of the power converter (122, 222) and across which is provided the start-up supply of DC power.

19. The power system (110, 210, 310) of claim 18 wherein the voltage of the start-up supply of DC power across the DC link capacitor (60) is greater than 100 $V_{DC}$.

* * * * *